United States Patent [19]
Anderson et al.

[11] Patent Number: 5,771,975
[45] Date of Patent: Jun. 30, 1998

[54] COMPOSITE CYLINDER TERMINATION

[75] Inventors: Jeffrey J. Anderson, Sunnyvale; Donald A. Nance, Mountain View; Craig S. Mickelson, San Jose, all of Calif.

[73] Assignee: Northrop Grumman Corporation, Los Angeles, Calif.

[21] Appl. No.: 800,600

[22] Filed: Feb. 14, 1997

[51] Int. Cl.$^6$ .............................. E21B 17/01; B29D 22/00
[52] U.S. Cl. ............... 166/367; 428/36.9; 428/36.91; 403/250; 403/259; 403/260; 403/334; 403/404; 405/169; 405/195.1; 285/114; 285/149; 166/350; 138/109; 138/139; 138/141
[58] Field of Search ................... 428/36.9, 36.91; 403/250, 259, 260, 334, 404; 405/169, 195.1; 285/114, 149; 166/350, 367; 138/109, 139, 141

[56] References Cited

U.S. PATENT DOCUMENTS

| | | | |
|---|---|---|---|
| 4,097,626 | 6/1978 | Tennent | 428/36 |
| 4,118,262 | 10/1978 | Abbott | 156/175 |
| 4,236,386 | 12/1980 | Yates et al. | 64/1 |
| 4,238,540 | 12/1980 | Yates et al. | 428/36 |
| 4,256,412 | 3/1981 | Tybus et al. | 403/267 |
| 4,470,621 | 9/1984 | Irvine | 285/114 |
| 4,634,314 | 1/1987 | Pierce | 405/195 |
| 4,701,231 | 10/1987 | Peters et al. | 156/172 |
| 4,709,231 | 11/1987 | Sakaibara et al. | 340/729 |
| 5,043,217 | 8/1991 | Peters et al. | 428/397 |
| 5,215,413 | 6/1993 | Nance | 403/259 |
| 5,439,323 | 8/1995 | Nance | 405/195.1 |
| 5,443,099 | 8/1995 | Chaussepied et al. | 138/109 |
| 5,474,132 | 12/1995 | Gallagher | 166/367 |

FOREIGN PATENT DOCUMENTS 1251262  10/1971  United Kingdom .

*Primary Examiner*—Samuel A. Acquah
*Attorney, Agent, or Firm*—Walter G. Sutcliff

[57] ABSTRACT

An end of a composite cylinder is formed about a multipiece end assembly having a contour which prevents the withdrawal of the end assembly from the cylinder. The pieces of the end assembly are relatively forced apart and a spacer is positioned between the parts to maintain the pieces in intimate contact with the inner surface of the cylinder thus preloading the end prior to application of an axial load or removing any residual gap from the manufacturing process. The cylinder may have end assemblies at both ends and to which may be coupled external connectors such as flange members, for construction of a marine riser.

28 Claims, 7 Drawing Sheets

COMPOSITE CYLINDER TERMINATION

STATEMENT OF GOVERNMENT INTEREST

This invention was made with United States Government Support under Cooperative Agreement 70NANB5H1047 awarded by the U.S. Department of Commerce, National Institute of Standards and Technology. The United States Government has certain rights in the invention.

BACKGROUND OF THE INVENTION

1. Field of the Invention

The invention in general relates to composite structures and more particularly to tubular composites with an end connection.

2. Description of Related Art

The use of composite materials in place of metal for various structures is desirable for many reasons, including weight reduction, corrosion resistance, durability and increased strength.

One type of structure which finds use in a variety of applications is a tube, or cylinder, which must be joined to another similar or dissimilar structure, at either or both ends. Accordingly, an end piece, of a material such as metal, is provided as the cylinder termination for the joining process. The use of adhesives for bonding the metal end piece to the composite cylinder may be less than satisfactory under certain conditions, particularly in the presence of large bending moments or axial loads which leads to debonding. Extreme environmental conditions such as immersion in water can weaken the bond. Large temperature changes can cause joint failure due to coefficient of thermal expansion mismatch induced thermal stresses.

Mechanical fasteners have also been used for securing the composite cylinder to the metal end piece. However, this form of connection requires drilling holes which tends to weaken the composite. Their performance also degrades under extreme environmental conditions of high temperature and immersion in water.

In another arrangement, such as described in U.S. Pat. No. 4,701,231 a composite cylinder has an end which is wound over, and bonded to, a contoured end piece which is of such geometrical shape that it is locked in place. This geometrical lock type joint typically has a bonded interface between the composite and end piece, however under large load conditions the bond may fail, allowing undesired relative movement between the composite and the end piece. Or it may become highly loaded during fabrication or use due to temperature changes. As with a conventional bonded joint when the bond fails an undesirable gap may open up.

The present invention provides a solution to the end joint problem so as to allow for a structure which can accommodate relatively high axial loads and bending moments without failure of the joint or without excessive movement.

SUMMARY OF THE INVENTION

A composite-to-end connection arrangement in accordance with the present invention includes a hollow cylinder of composite material which extends along a central longitudinal axis. An end connection assembly having a plurality of segments is provided, with at least one of the segments being in contact with the inner surface of the cylinder at an end portion. In one preferred embodiment two segments are in contact with the inner surface.

The end of the cylinder is formed about the segment, or segments, so as to assume the contour thereof, the contour having a predetermined shape so as to prevent withdrawal of the segment, or segments from the cylinder.

The arrangement includes spacer means positioned between two segments, separating the segments and forcing one or both into intimate contact with the inner contoured surface of the cylinder to limit axial movement of the assembly due to a predetermined load condition.

DESCRIPTION OF THE PREFERRED EMBODIMENTS

Although the present invention finds use with a variety of structures including rocket motor cases, pressure vessels and missile launcher tubes, it will be described by way of example with respect to a marine riser such as the drilling riser illustrated in FIG. 1.

Figure 1:
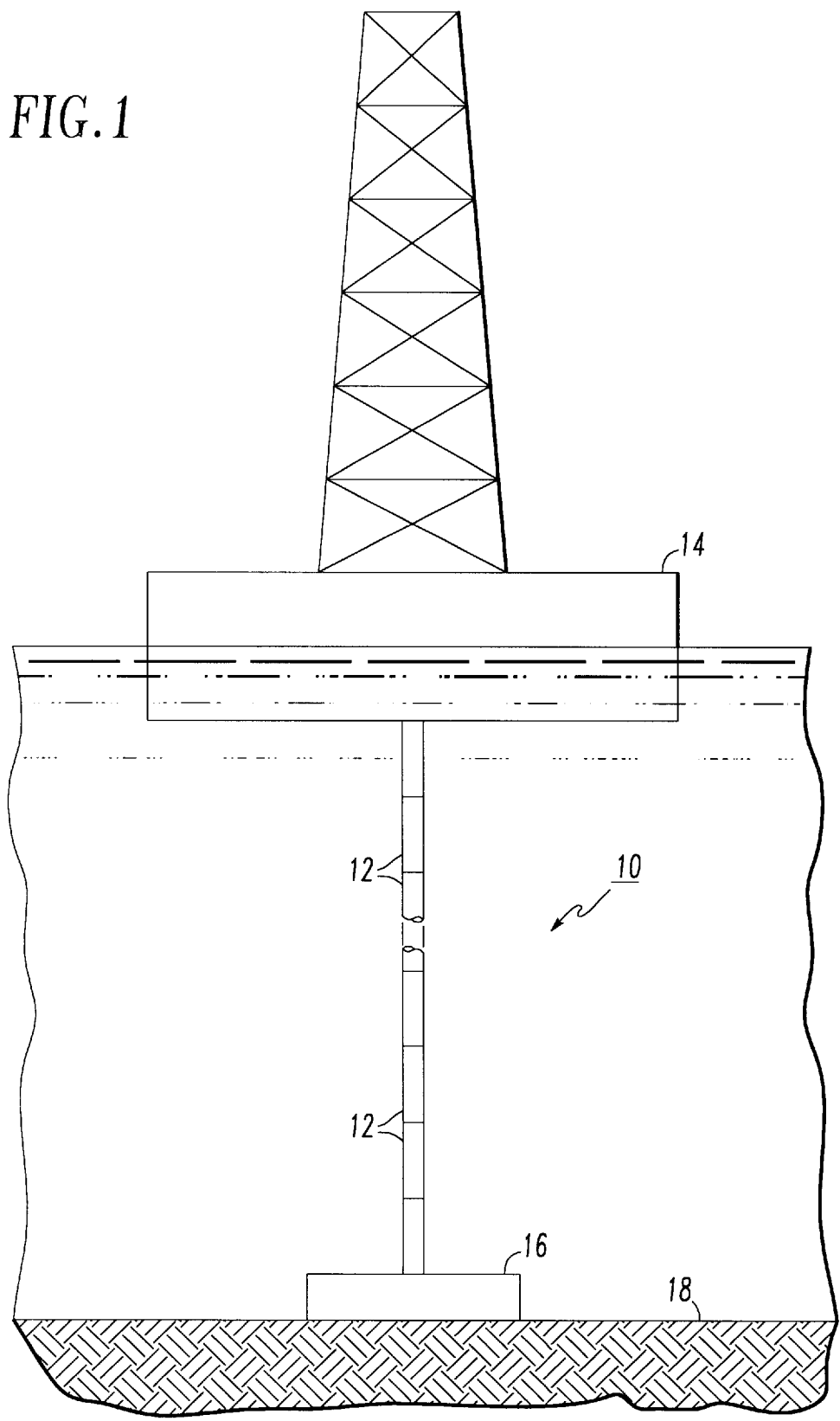
FIG. 1 illustrates one of many applications for the present invention.

In FIG. 1 a riser arrangement 10 made up of a plurality of riser sections 12 extends from a floating platform 14 at the surface to drilling equipment 16, such as a blowout preventer, located on the bed 18 of a body of water. The primary function of the riser 10 is to guide drill pipe and tools to the well bore and to provide a return path for drilling mud which is pumped down the center of the drill pipe to cool and lubricate the drill bit, flush tailings out of the bore and balance the hydrostatic pressure of the formation being drilled through.

Drilling risers are generally of medium strength steel which create significant weight loads for the floating platform 14. Accordingly, advanced composite drilling risers are being considered as a replacement for steel thereby significantly reducing the deck weight of the riser system, and allowing a greater number of riser sections to be carried, to extend the drilling capabilities to greater depths.

One key to implementing composite technology in drilling risers is the development of composite-to-steel structural joints between the composite cylinder and a steel end connector. A similar need exists in the case of production marine risers, which are similar to drilling risers but are of lesser diameter and are used after a producing well is established.

Figure 2A:
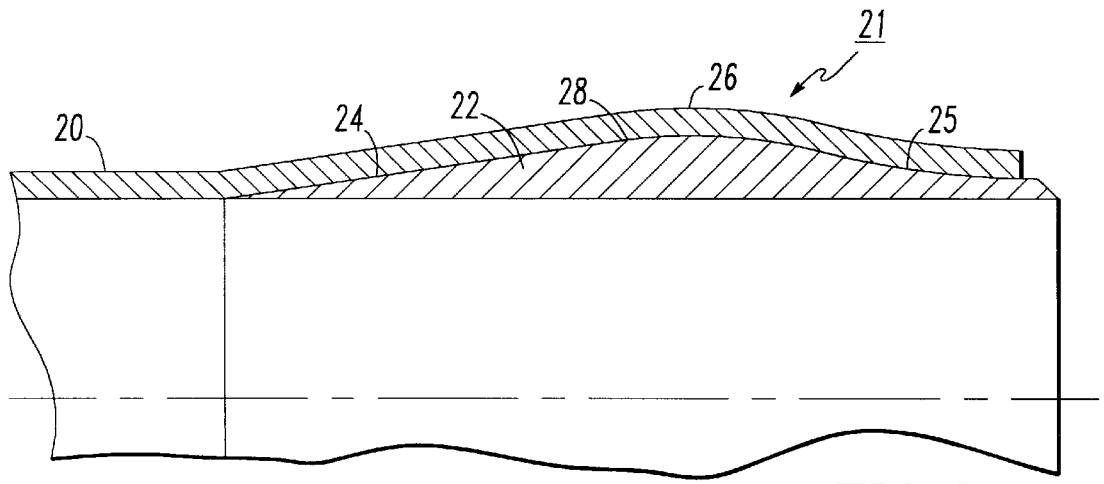
FIGS. 2A to 2C illustrate a geometric lock joint of the prior art.

FIG. 2A illustrates, in cross-sectional view, an end connection for a composite cylinder in an arrangement which prevents the connection from being withdrawn from the composite cylinder. The structural arrangement, more fully described in the aforementioned U.S. Pat. No. 4,701,231, includes a composite cylinder 20 which extends along a central longitudinal axis C. Cylinder 20 has an end portion 21 formed about an internal ring 22, such as by filament winding, to thereby conform to the contour of the ring 22.

The contour of the ring 22 is defined by hyperboloidal surface portions 24 and 25 on either side of an isotensoidal, or circular arc surface portion 26, which defines the maximum diameter of the ring 22.

Figure 2B:
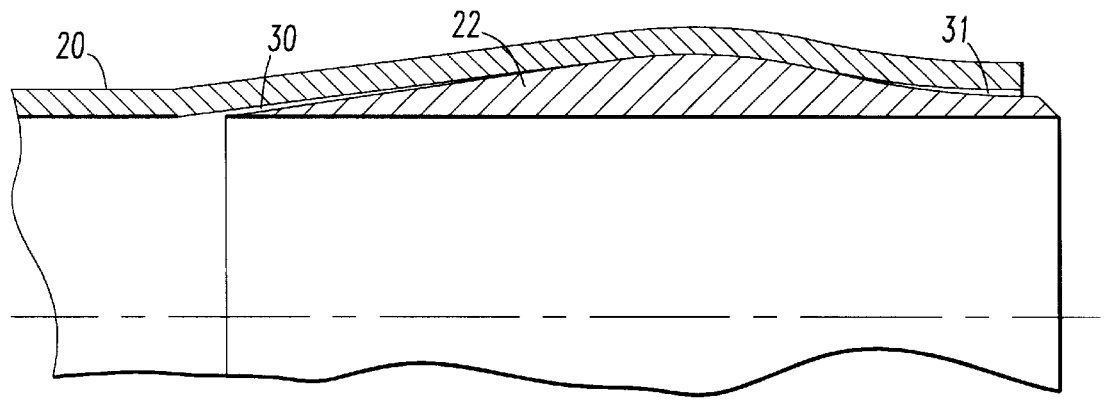

The arrangement typically incorporates an optional adhesive bond 28 between the ring 22 and the inner surface of the cylinder end 21. If an elevated temperature cure composite is used, its coefficient of thermal expansion needs to be tailored by varying the fiber type and orientation during winding so that it matches that of the material being wound over, typically steel, aluminum or titanium. A large coefficient of thermal expansion mismatch yields high residual thermal stresses in the bondline between the composite and metallic ring which may lead to debonding as the parts cool down from an elevated temperature. This is illustrated in FIG. 2B by debonded portions 30 and 31. A similar gap can occur if there is not adhesive at the interface with temperature environmental changes.

Figure 2C:
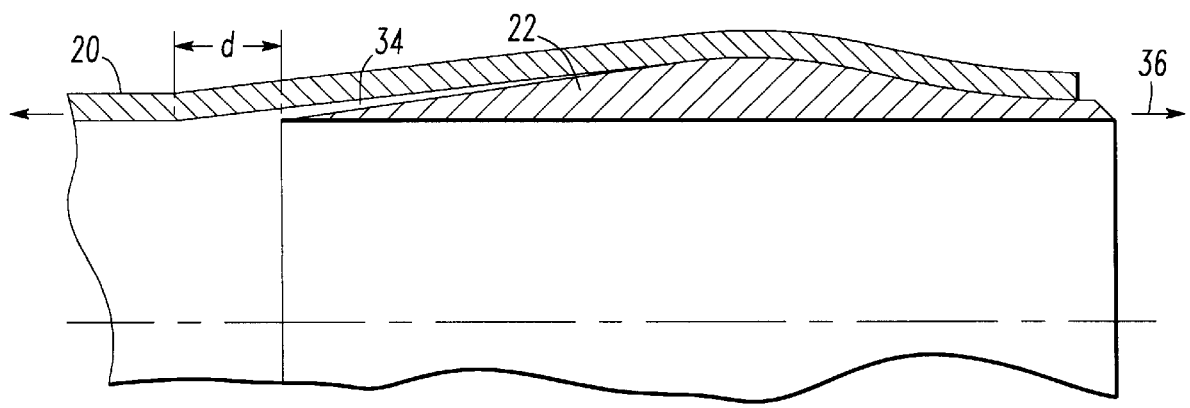

Stress concentrations and high residual thermal stresses can lead to premature bond failure as can poor bond quality, environmental effects and fatigue. Complete bond failure, as depicted by numeral 34 in FIG. 2C, results in a relatively large displacement, d, between the cylinder 20 and the initial position of ring 22, when subjected to an axial load represented by arrow 36. Although the ring 22 is not withdrawn from the cylinder 20 as a result of the axial load, large relative motions will cause damage to the composite cylinder 20 due to fretting and abrasion. The relative motion will also damage an inner liner, if used.

Figure 3A:
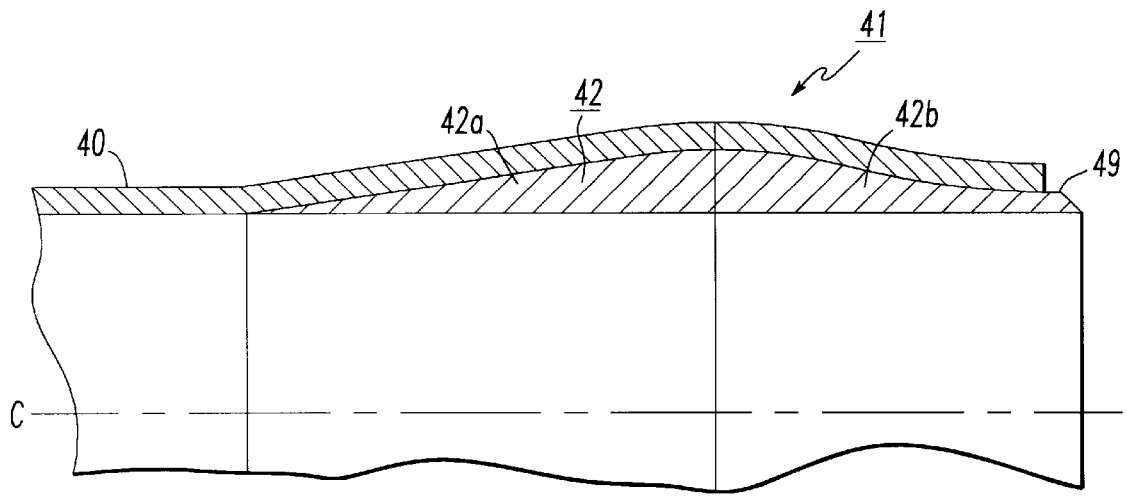
FIGS. 3A to 3C illustrate the principle involved in the present invention.
Figure 3B:
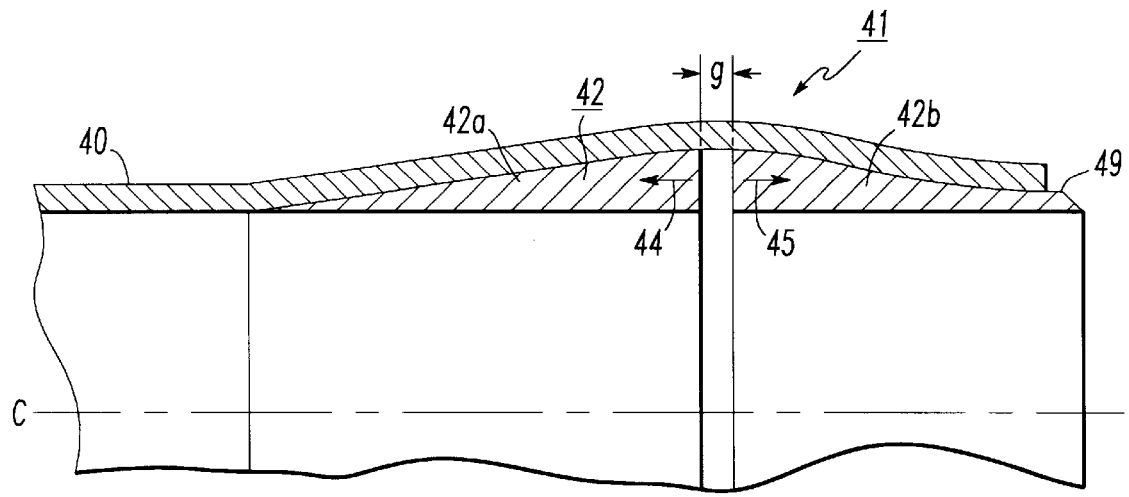
Figure 3C:
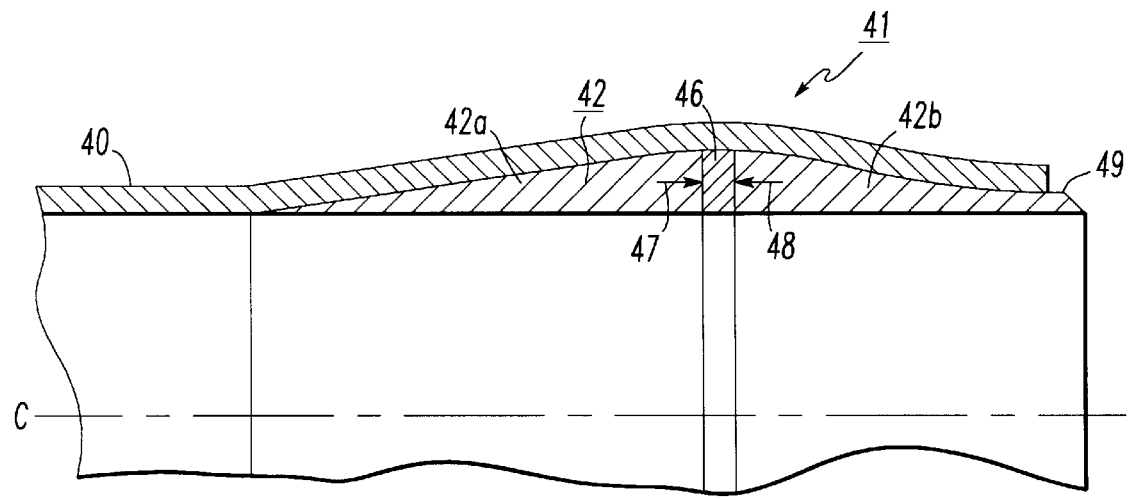

FIGS. 3A to 3C serve to illustrate the basic concept of one embodiment of the present invention. In FIG. 3A, a cylinder 40 of composite material extends along, and surrounds a central longitudinal axis C. An end 41 of the cylinder 40 is formed around an end connection assembly 42, having a contour which will prevent its withdrawal from the cylinder. The forming may be accomplished by a variety of composite fabrication processes such as filament winding, tape laying, roll wrapping or hand layup, to name a few. The end connection assembly may be of a metal such as steel and its contour may be as previously described in FIG. 2A with respect to ring 22.

The end connection assembly however in the present invention includes a plurality of longitudinally displaced segments, two, 42a and 42b, being shown by way of example. In one embodiment, the two segments 42a and 42b initially touch one another such as at the point of maximum outside diameter and one, or both, of the segments are free to move in an axial direction. That is, by use of a mold release agent covering their surface, they are not bonded to the inner surface of the cylinder.

The two segments 42a and 42b are relatively forced apart, as indicated by arrows 44 and 45 in FIG. 3B, leaving a gap g between them. The separation process may be accomplished by applying an external force to the outermost segment 42b, while holding segment 42a immobile or by tooling which contacts and separates both segments 42a and 42b to preload the composite-metal interface.

Once separated, and as indicated in FIG. 3C, a spacer 46 is inserted into the gap between the ends of segments 42a and 42b, the external separating force is removed, and the restoring force, as indicated by arrows 47 and 48, maintain the spacer 46 in position.

As shown in these Figs., as well as in the the various embodiments of the invention, a portion, such as 49, of one of the segments extends past the end of the composite cylinder. An external connector may then be coupled to this extended portion for joining the cylinder to another structure.

Several embodiments of the invention using an end connection assembly with longitudinally arranged segments are illustrated in FIGS. 4A to 4G.

Figure 4A:
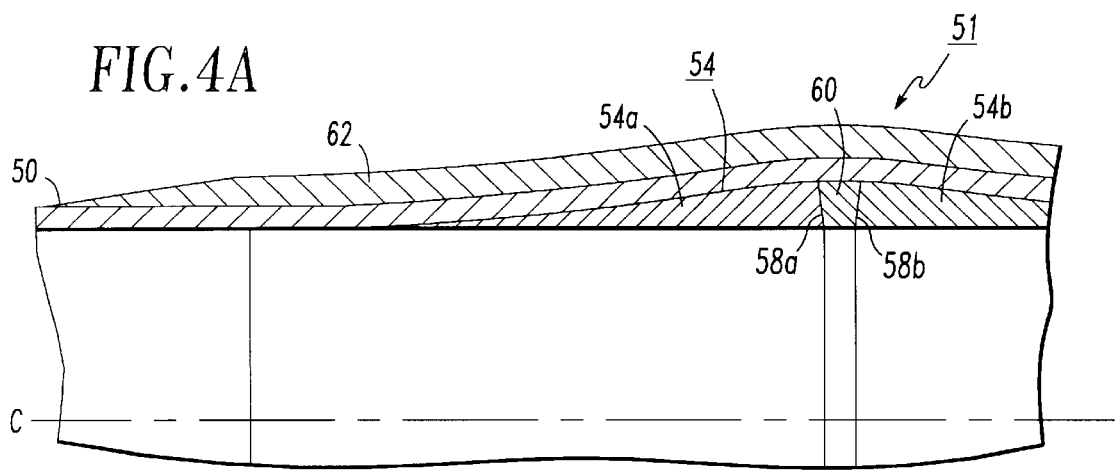
FIGS. 4A to 4G illustrate various embodiments of the present invention wherein segments of an end connection assembly are longitudinally arranged.

FIG. 4A illustrates a composite cylinder 50, having an end portion 51, and similar to that of FIG. 3A. An end connection assembly 54 includes sections 54a and 54b each having a respective tapered end 58a and 58b. A spacer in the form of wedge 60 conforming to the tapered ends 58a and 58b is positioned between segments 54a and 54b to separate them and force them into intimate contact with the inner contoured surface of the cylinder 50 to limit axial movement of the assembly 54 due to a predetermined load such as an externally applied axial load or a thermal load which may cause a gap due to differential thermal contraction of parts. Wedge 60 may be formed in a plurality of circumferential sections for ease of insertion into the wedge shaped gap between segments 54a and 54b.

In order to reduce the amount of displacement when preloading is applied and to reduce stresses in the joint area, a circumferential overwrap 62 may be applied over the end of the cylinder 50.

Figure 4B:
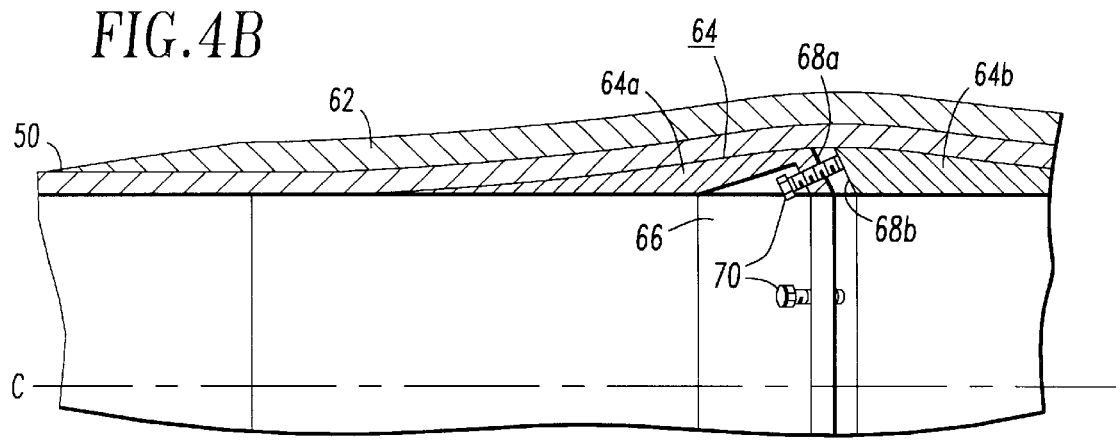

In FIG. 4B the end connection assembly 64 includes segments 64a and 64b. Counterbores, or access groove 66 near the end 68a of segment 64a accommodates, and allows access to a plurality of jack screws 70. These jack screws 70 are circumferentially arranged and protrude through the end 68a and bear against the end 68b of segment 64b. Advancement of the jack screws 70 applies a separating force to the segments 64a and 64b to accomplish the desired function.

Figure 4C:
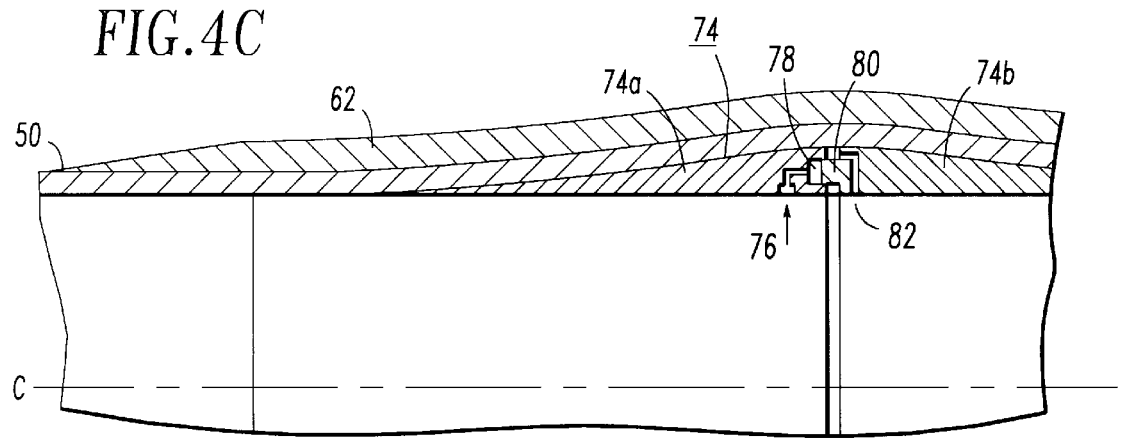

In FIG. 4C, segments 74a and 74b of end connection assembly 74 meet in a tongue-in-groove relationship and are forced apart by means of hydraulic pressure. More particularly, a fluid such as resin is hydraulically introduced into passageway 76 thus forcing the segments 74a and 74b apart. After a sufficient passage of time, injected resin would attain a hardened condition in the cavity 78, formed as a result of the separation process, and act as a separating spacer means. If desired, a resin or potting compound may be injected into the resulting surrounding annulus 80 via passageway 82.

Figure 4D:
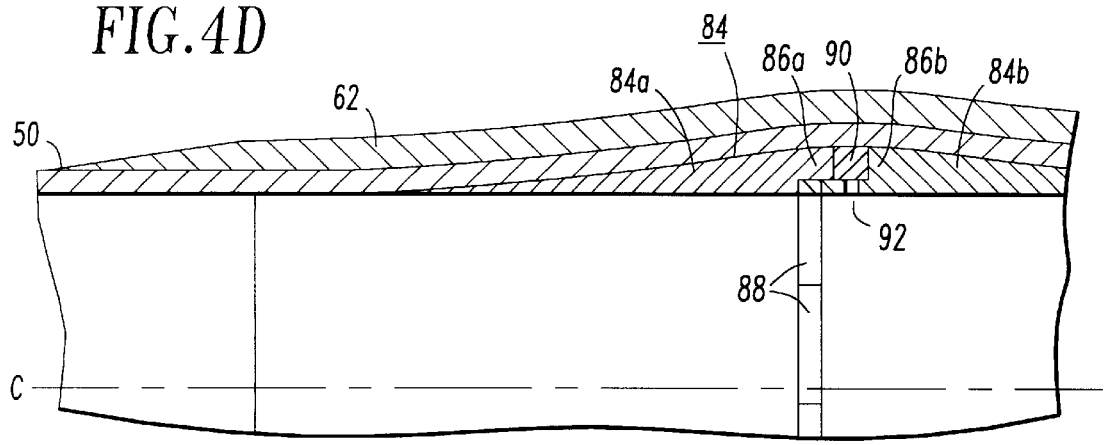

In FIG. 4D, the end connection assembly 84 includes segments 84a and 84b having respective overlapping ends 86a and 86b. When the segments are separated, a split ring spacer 88, in several parts, may be inserted into the gap and the annulus 90 may be filled with a resin or potting compound via passageway 92.

Figure 4E:
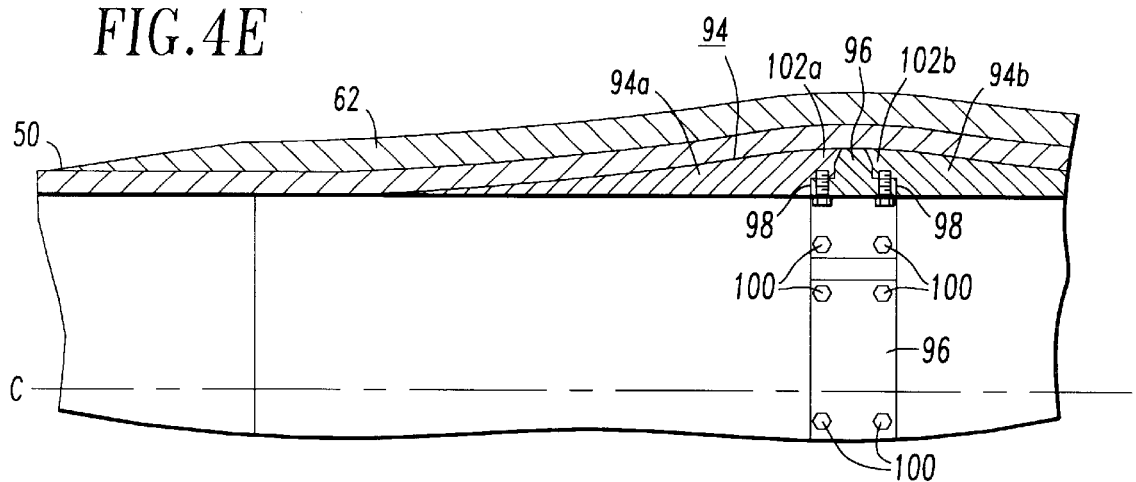

The end connection assembly 94 of FIG. 4E has the separation between segments 94a and 94b filled in by means of a plurality of wedge inserts 96. Each wedge insert includes a lower flange 98 through which a series of fasteners 100 secure the wedge to the respective ends 102a and 102b of segments 94a and 94b, said ends being shaped to conform to the shape of the wedge 96.

Figure 4F:
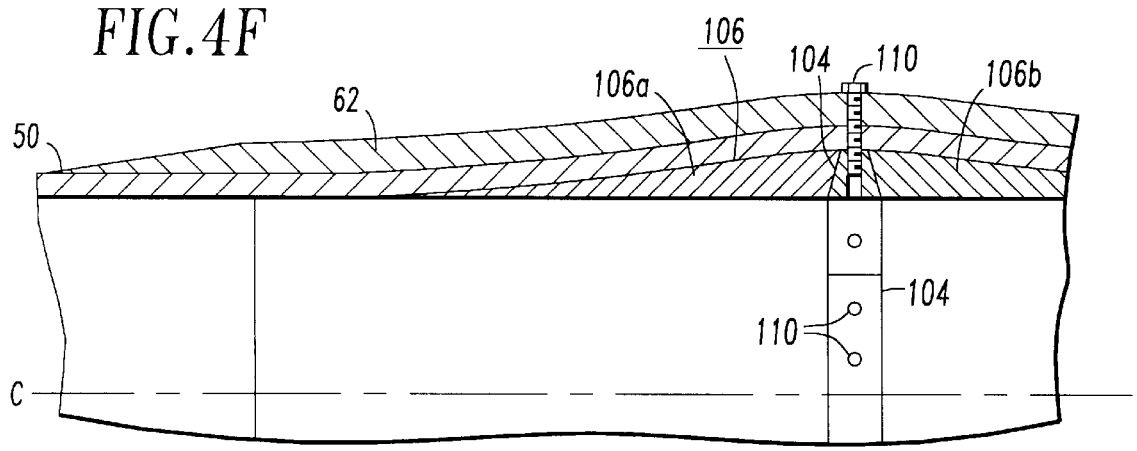

The embodiment of FIG. 4F is somewhat similar to that of FIG. 4A in its inclusion of a plurality of tapered wedges 104 separating and forcing apart segments 106a and 106b of end connection assembly 106. In the embodiment of FIG. 4F, the wedges are maintained in position by means of fasteners 110 which pass through the end of cylinder 50 as well as the circumferential overwrap 62. Although the structure, may be weakened somewhat by the inclusion of holes in the composite, the arrangement may be used for low strength requirements.

Figure 4G:
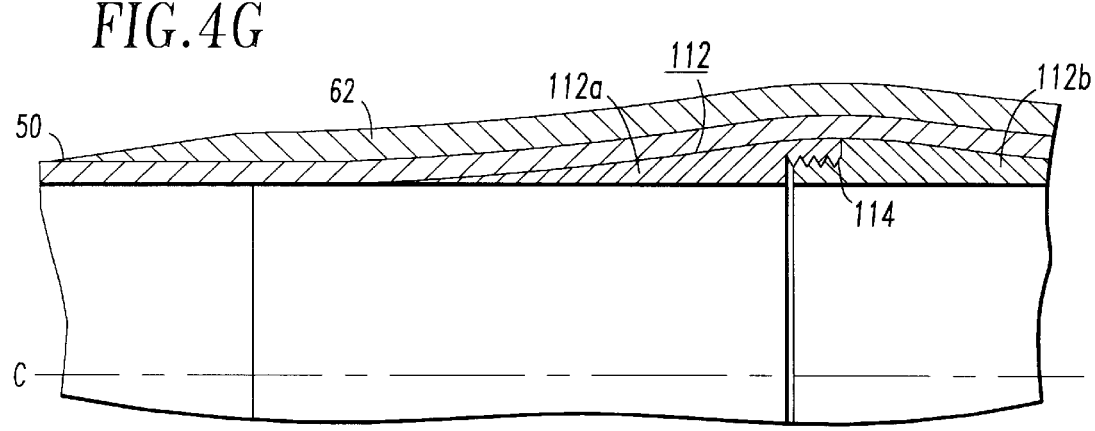

In FIG. 4G segments 112a and 112b of end connection assembly 112 have complementary screw threads which engage one another, as indicated by numeral 114, so that relative rotation of the segments will cause them to move axially relative to one another and maintain the segments 112a and 112b in a forced apart condition.

Figure 5:
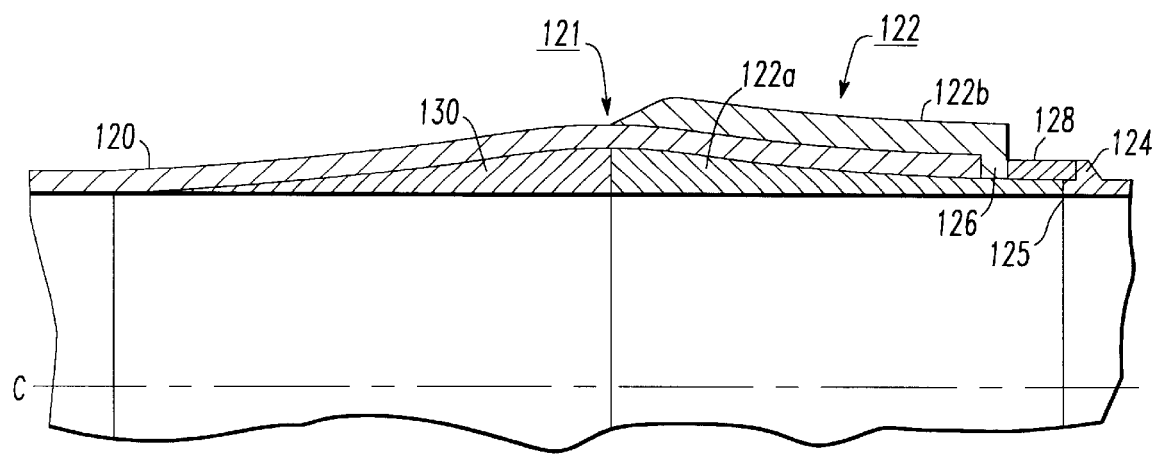
FIG. 5 illustrates an embodiment of the invention wherein segments of an end connection assembly are coaxially arranged.
Figure 6:
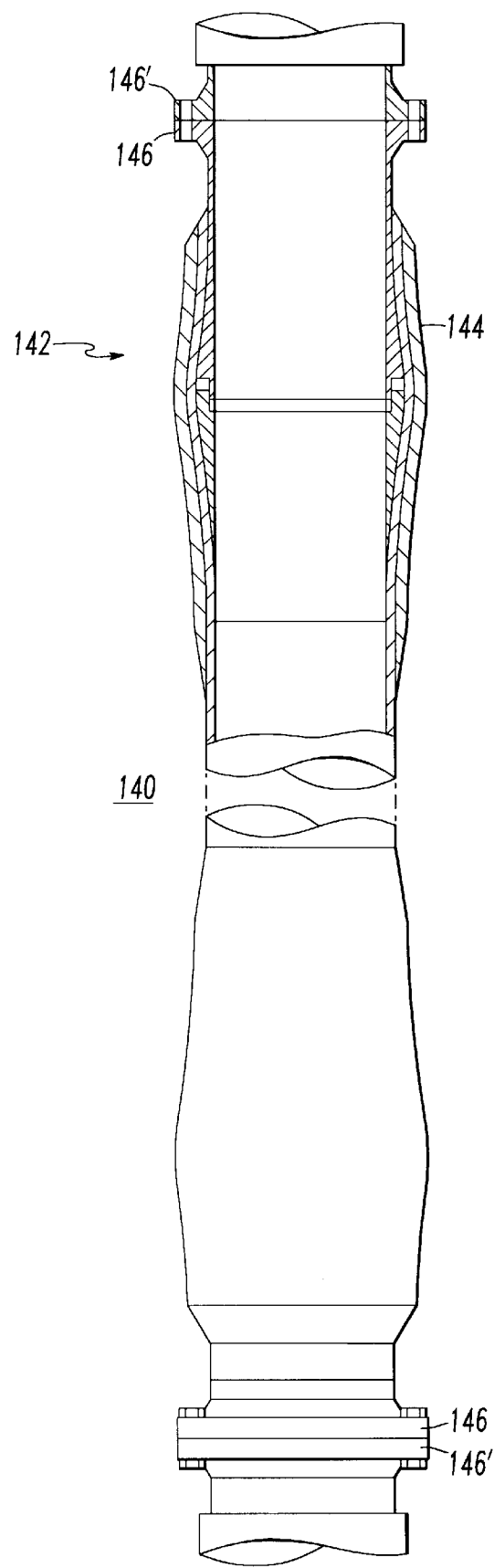
FIG. 6 illustrates a marine riser section made in accordance with the present invention.

Another embodiment of the invention is illustrated in FIG. 5. A composite cylinder 120, having an end portion 121, surrounds a central longitudinal axis C. An end connection assembly 122 includes a plurality of segments, two, 122a and 122b, being shown by way of example. The segments of FIG. 5 are arranged such that one segment, 122a, is located against the inner surface of cylinder 120 while the other segment 122b contacts the outer surface of cylinder 120 and surrounds the major portion of segment 122a.

Segment 122a extends past the end of cylinder 120 and includes a projection 124. This projection is on a portion of the segment which is welded on, as indicated by weld 125, after segment 122b is placed into position. Segment 122b also includes a projection 126 such that when the segments are moved apart, a multipart spacer 128 may be inserted into the gap between the projections 124 and 126. During the cylinder forming process, such as by filament winding around the inside segment 122a, a filler member 130 is positioned within the cylinder 120 adjacent segment 122a to achieve the desired contour and to eliminate any gaps in the inside diameter of the cylinder 120.

As previously brought out, the embodiments of the invention include a feature wherein a portion of one of the segments extends past the end of the composite cylinder. An external connector such as a flange, threaded connector, radially dogged connector, or the like, may then be coupled to this extended portion for joining the cylinder to another structure.

By way of example, and with reference to FIG. 9, there is illustrated, partially in section, a typical marine riser 190 including end connection arrangements 192 at both ends and constructed in accordance with the teachings herein. With an end connection assembly 194 having segments made of a metal such as steel, an external connector such as steel flange 196 may be welded to the exposed ends of the segments at either end of the riser section 190. The flanges 196 may then be bolted to the flanges 196' of respective adjacent riser sections, with the process being repeated, thus resulting in a light weight marine riser system.

What is claimed is:

1. A composite-to-end connection arrangement comprising:
   (A) a hollow cylinder of composite material extending along a central longitudinal axis;
   (B) an end connection assembly having a plurality of segments, at least one of which is in contact with the inner surface of said cylinder at an end thereof;
   (C) said end of said cylinder being formed about said at least one segment to assume the contour thereof, said contour having a predetermined shape so as to prevent withdrawal of said segment from said cylinder; and
   (D) spacer means positioned between two of said segments separating said segments and forcing at least one of them into intimate contact with the inner contoured surface of said cylinder, to limit axial movement of said assembly due to a predetermined load, or to chose any gaps or separation between the composite cylinder and the segments that may arise due to thermal contraction.

2. An arrangement according to claim 1 wherein:
   (A) said composite cylinder is formed about said at least one segment by a process selected from the group consisting of filament winding, tape laying, roll wrapping and hand layup.

3. An arrangement according to claim 1 wherein:
   (A) said end connection assembly includes two segments, one on the inside of said cylinder and the other on the outside of said cylinder.

4. An arrangement according to claim 3 wherein:
   (A) the outside segment is coaxial with, and surrounds the inside segment.

5. An arrangement according to claim 4 wherein:
   (A) said predetermined contour is hyperboloidal; and which includes
   (B) a filler member positioned within said cylinder adjacent said inside segment;
   (C) said filler member having a contour which is hyperboloidal.

6. An arrangement according to claim 1 wherein:
   (A) another one of said end connection assemblies is positioned at the opposite end of said cylinder.

7. A composite-to-end connection arrangement comprising:
   (A) an hollow cylinder of composite material extending along a central longitudinal axis;
   (B) an end connection assembly having a plurality of longitudinally arranged segments coaxial with said axis and in contact with the inner surface of said cylinder at an end thereof;
   (C) said end of said cylinder being formed about said longitudinally arranged segments to assume the contour thereof, said contour having a predetermined shape so as to prevent withdrawal of said segments from said cylinder; and
   (D) spacer means positioned between at least two of said segments separating said segments and forcing them into intimate contact with the inner contoured surface of said cylinder, to limit axial movement of said assembly due to predetermined load condition, or to chose any gaps or separation between the composite cylinder and the segments that may arise due to thermal contraction.

8. An arrangement according to claim 7 wherein:
   (A) said composite cylinder is formed about said longitudinally arranged segments by a process selected from the group consisting of filament winding, tape laying, roll wrapping and hand layup.

9. An arrangement according to claim 7 which includes:
   (A) a circumferential overwrap, covering said end of said cylinder.

10. An arrangement according to claim 7 wherein:
    (A) said contour is defined by two joined hyperboloids, or similar curve.

11. An arrangement according to claim 10 wherein:
    (A) said hyperboloids are joined by an isotensoidal, or curved contour.

12. An arrangement according to claim 7 wherein:
    (A) said end connection assembly has two segments having ends which initially contact each other at an area of maximum diameter of said end of said cylinder.

13. An arrangement according to claim 7 wherein:
    (A) said end connection assembly has first and second segments having ends which face each other;
    (B) said ends being tapered; and wherein
    (C) said spacer means includes a wedge having tapered faces complementary with said tapered ends of said segments.

14. An arrangement according to claim 13 wherein:
(A) said wedge includes a flange secured to said first and second segments.

15. An arrangement according to claim 12 wherein:
(A) said wedge has an aperture therethrough;
(B) said end of said cylinder has an aperture therethrough; and which includes
(C) a fastener which extend through said apertures in said wedge and said end of said cylinder.

16. An arrangement according to claim 7 wherein:
(A) said end connection assembly has first and second segments having ends which face each other;
(B) said first segment including at least one access groove near the end thereof;
(C) said spacer means including at least one jack screw extending from said groove through said end and contacting the end of said second segment to force said segments apart.

17. An arrangement according to claim 7 wherein:
(A) said end connection assembly has first and second segments having ends which face each other and form a tongue-in-groove relationship;
(B) at least one of said segments including a passageway leading to said end of said segment from the interior of said cylinder;
(C) said spacer means is constituted by a solidified liquid which is initially introduced into said passageway in a liquid state to force said segments apart.

18. An arrangement according to claim 7 wherein:
(A) said end connection assembly has first and second segments having respective ends with screw threads which threadedly engage each other;
(B) said spacer means is constituted by said screw threads after unscrewing said segments by a predetermined amount.

19. An arrangement according to claim 7 wherein:
(A) said spacer means is a multipart ring.

20. An arrangement according to claim 1 wherein:
(A) at least one of said segments extends past said end of said cylinder; and which includes
(B) an external connector coupled to said segment which extends past said end of said cylinder.

21. An arrangement according to claim 20 wherein:
(A) said segment which extends past said end of said cylinder is metal; and
(B) said external connector is a metal flange welded to said segment.

22. An arrangement according to claim 6 wherein:
(A) said cylinder is a marine riser.

23. An arrangement according to claim 22 which includes:
(A) first and second external connectors respectively connected to said end connection assemblies at the ends of said cylinder.

24. An arrangement according to claim 7 wherein:
(A) at least one of said segments extends past said end of said cylinder; and which includes
(B) an external connector coupled to said segment which extends past said end of said cylinder.

25. An arrangement according to claim 24 wherein:
(A) said segment which extends past said end of said cylinder is metal; and
(B) said external connector is a metal flange welded to said segment.

26. An arrangement according to claim 7 wherein:
(A) said cylinder is a marine riser.

27. An arrangement according to claim 26 which includes:
(A) first and second external connectors respectively connected to said end connection assemblies at the ends of said cylinder.

28. A method of making an end termination for a composite cylinder, comprising the steps of:
(A) forming at least one end of said cylinder about a member having a contour to prevent its withdrawal from said cylinder; and
(B) preloading said member relative to said cylinder by forcing said member into contact with the inner surface of said cylinder prior to use.

* * * * *